United States Patent [19]

Fishbein

[11] 3,873,683

[45] Mar. 25, 1975

[54] PREGNANCY TEST COMPOSITION AND METHOD

[75] Inventor: Bernard Fishbein, Princeton, N.J.

[73] Assignee: Princeton Laboratories, Inc., Princeton, N.J.

[22] Filed: May 2, 1973

[21] Appl. No.: 356,628

Related U.S. Application Data

[63] Continuation of Ser. No. 782,745, Dec. 10, 1968, abandoned.

[52] U.S. Cl. ............................ 424/12, 424/8, 424/78
[51] Int. Cl. ...................... G01n 31/00, G01n 33/16
[58] Field of Search ........................................ 424/12

[56] References Cited
UNITED STATES PATENTS

| | | | |
|---|---|---|---|
| 3,088,875 | 5/1963 | Fisk | 424/12 |
| 3,551,555 | 12/1970 | Schuurs | 424/12 |

FOREIGN PATENTS OR APPLICATIONS

| | | | |
|---|---|---|---|
| 6,504,823 | 10/1966 | Netherlands | 424/12 |
| 684,708 | 1/1967 | Belgium | 424/12 |

OTHER PUBLICATIONS

Fitzgerald, J. of the Am. Med. Tech. (reprint from Vol. 34, Sept–Oct., 1972, pp. 425–431.
Robbins, PSEBM, Vol. 109, 1962 pp. 321–325.
Keele, J. Clin, Endocrin. & Metab., Vol. 22, No. 3, March, 1962, pp. 287–299.

Primary Examiner—Albert T. Meyers
Assistant Examiner—A. P. Fagelson
Attorney, Agent, or Firm—Ostrolenk, Faber, Gerb & Soffen

[57] ABSTRACT

There is provided a novel composition for the direct determination of the existence of pregnancy by the admixture therewith of a sample of urine, plasma, or serum from the female believed to be pregnant. This novel composition is prepared by mixing serum obtained from rabbits previously injected with human chorionic gonadotrophin (HCG), with polystyrene latex particles and heating for a short time.

10 Claims, No Drawings

PREGNANCY TEST COMPOSITION AND METHOD

CROSS REFERENCE TO RELATED APPLICATION

This a continuation of application Ser. No. 782,745 filed on Dec. 10, 1968, now abandoned.

FIELD OF THE INVENTION

Direct one-step pregnancy tests.

DESCRIPTION OF THE PRIOR ART

The use of latex reagents for the testing of the presence of HCG, which indicates the existence of pregnancy has been the subject of much recent activity in the diagnostic art. The work in this area has been directed to the preparation of compositions which show rapid agglutination upon contact with antibodies to HCG, and wherein agglutination is inhibited in the presence of HCG or substances containing HCG. Among developments in this area may be cited Fisk, U.S. Pat. No. 3,088,875. A test described in Belgian Pat. No. 684,708 may also be cited wherein there is disclosed a composition which is formed by injecting HCG or a source thereof into rabbits, and subsequently bleeding the rabbits to obtain blood containing HCG anti-serum. The blood is then subjected to dextran chromotography to isolate the gammaglobulin component which is then absorbed onto polystyrene particles of a mean diameter of 80 millimicrons. Agglutination is achieved by treating the thus prepared suspension of polystyrene latex with a urine sample containing HCG to determine the existence of pregnancy by the appearance of agglutination. This process requires a step of separating the anti-HCG globulin from the blood sample and furthermore appears to be limited in its applicability to use with urine samples. The present process, however, is highly sensitive, is applicable to both blood and urine samples, and does not necessarily require separation of the anti-HCG globulin.

SUMMARY OF THE INVENTION

It has been found that an agglutination composition for the detection of HCG may be prepared without the laborious step of separating a highly refined anti-HCG globulin serum from blood. The test compositions of the present invention may be prepared in the following manner: HCG, or a source thereof, is administered to rabbits which are then bled after a certain period of time. The anti-serum thus obtained is diluted and mixed with polystyrene latex, containing particles of the order of approximately 80 millimicrons. The mixture is then heated for a short time and cooled.

A drop of the suspension thus obtained may be mixed with a drop of urine, plasma, or serum taken from a female suspected to be pregnant. Agglutination of the mixture of these components indicates the presence of HCG in the urine, plasma, or serum, which in turn indicates the state of pregnancy of the source. The time for agglutination to occur is extremely rapid, a positive result if it is to occur, will be noted within the time of about 2 minutes. It has been found that the present test is highly sensitive and has a further advantage in that it may be used not only with urine but with plasma or serum as well.

DESCRIPTION OF THE PREFERRED EMBODIMENTS

In the preferred embodiments of the present invention HCG anti-serum is prepared. In the preferred mode of preparation highly purified HCG having a strength about 5,000 and 15,000 iu/mg. is dissolved in a suitable carrier such as saline to yield a concentration of the order of 10,000 to 20,000 iu/ml. This solution is mixed with an equal volume of Freund's complete adjuvent or other suitable carrier and between 0.25 and 1, preferably about 0.5 ml of the solution is injected subcutaneously into lower mammals. suitably sheep, hares or rabbits. The injections are repeated once a week for a period of between 6 and 10 weeks, suitably for about 8 weeks. At the end of the week of the last injection, the animals are bled and the serum obtained by the centrifugation of whole blood. The serum thus obtained is stored in the cold suitably at between about −10 to about −30°C until used.

Prior to use, the anti-HCG serum thus obtained is extracted with a suitable water immiscible fat solvent for example chloroform, heptane, benzene, or the like to remove the fat in the serum. Where the fat content of the serum is low, this step becomes optional and may, if desired, be omitted. The serum thus obtained may be used to coat the latex particles.

If desired, though this step is by no means critical to the invention. The globulin fraction of the serum may be isolated. In one method of isolation, the serum is diluted with an equal volume of saturated, aqueous ammonium sulfate, and the resulting suspension kept in a refrigerator suitably between −5° to +5°C for from about 8 to 18 hours. The suspension is then cetrifuged and the supernatent solution discarded. The resulting globulin precipitate, which contains the anti-HCG antibodies is dissolved in distilled water, dialyzed against distilled water until free of salt and the contents of the dialysis bag removed and lyophilized. The lyophilized residue is then reconstituted with a dilute aqueous saline solution containing approximately 1 per cent by weight of sodium chloride and the solution kept frozen until use.

Yet another procedure for isolation of the anti-body is the Cohn Fraction II method 6 and 9. This fraction is composed chiefly, although not exclusively of gammaglobulin.

In yet another method of obtaining the anti-body fraction, rabbits are injected with HCG and bled after a period of 14 to 18 weeks. The serum is isolated in the usual manner by centrifugation and purified by chromatography on dextran, suitably on Sephadex G. (Pharmacia, Uppsala, Sweden), preferably, Sephadex G-200. The serum was previously being treated with an aqueous solution of sodium chloride in the presence of tris (hydroxymethyl) aminoethane. The serum is then eluted with the same solution, suitably having an NaCL/THAM ratio of 1:0.1 at a pH of 8.0. The eluate is then dialyzed, and lyophilized to yield the desired anti-body.

The latex particles to be coated, are most suitably polystyrene. The latex particles have a diameter in the range of 0.15 to 1.0 suitably 0.6 to 0.9 microns. The latex to be coated is suspended in distilled water, suitably at 0.5–2 percent concentration. It is preferred, however, to achieve an ultimate concentration of 1% latex though this is by no means to be considered critical.

Where the source of the HCG antibodies is rabbit anti-serum the serum is added to the latex suspension, stirred, and heated about 54 to about 57°C suitably at about 56°C for from about 1 to about 2 hours preferably for about one hour. In the preferred modification there is utilized a volume of serum which, when added to a 2 percent suspension of latex, will result in approximately a 1:50 dilution of the antiserum in the volume of latex suspension utilized and heated at 56°C for one hour. The mixture is then diluted with an equal volume of distilled water and the suspension stirred and may be reheated in a similar manner for a similar time. In place of dilution with distilled water a buffer may be utilized; any mild buffer, such as an alkali, citrate, glycine or ethylene diamine tetraacetic acid may be utilized to give a solution having a pH of between 6.0 and 8.4. After the initial heating step, or where the suspension is reheated, after the reheating step, the suspension is stored at between 0°C and 6°C suitably at about 4°C until use.

Where it is desired to utilize the globulin fraction in place of the whole serum to coat the latex, the globulin solution is diluted 1 to 1 with an aqueous solution containing from about 10 to about 50 per cent of albumin from any source. The latex/globulin mixture is then treated in the same way as the serum/latex mixture. Similarly if desired, the mixture may be diluted with or without a buffer.

The method of carrying out the agglutination test is extremely simple. The basis of method is to mix a small amount, of the order of one drop, (i.e., between 0.025 and 0.1 ml., suitably, 0.05 ml.) of the latex reagent with a similar amount of the serum, plasma, or urine and to observe the occurrence or nonoccurrence of agglutination of the reagent. In the preferred modification of the test, there is utilized a glass slide, suitably a blue glass slide having placed thereon three raised ceramic rings. In the outer rings there is placed a drop of buffered saline and a drop of latex reagent respectively to serve as controls. In the inner ring there is placed one drop of the test sample. As stated above, the advantage of a present test is that it may be employed not only with urine but also with serum, or plasma. Where urine is used as the test sample it is preferred that the specimen be chilled, filtered through hard retentative filter paper, such as Whatman No. 42, and then brought to room temperature prior to testing. Where serum or plasma is utilized a drop of test specimen is diluted with one drop of a diluent suitably a buffer. To the specimen there is added one drop of well-mixed suspension of the anti-HCG coated latex particles. The two portions are then thoroughly mixed with an applicator stick, and the slide gently rotated. This rotation may be carried out either by hand, or by placing it on the platform of an oscillating platform rotator rotating at approximately 10 rpm., for from 1 to 3 minutes, suitably for about two minutes. A strong direct light is then placed directly above the slide which is then observed for agglutination by comparison to the two control circles. Care should be taken that the slide is not exposed to air for more than about three minutes, since excessive evaporation may then occur resulting in the precipitation of the latex particles.

In a clinical trial of the test utilizing serum or plasma as the test specimen, 36 patients were tested showing 36 positive (i.e., pregnancy) indications and no negative indications out of thirty-six clinically confirmed pregnancies. Thus the test gave rise to no false negatives. In the same test a control group of 56 patients showed 55 negative (i.e. Non-pregnancy) indications and one positive indication. It is believed that this positive indication was a false positive; however the patient was lost to clinical follow-up and this diagnosis could not be confirmed.

It is thus demonstrated that the test procedure of the present invention provides an accurate direct agglutination test for use with serum or plasma, which has not been available to the clinical art heretofore.

EXAMPLE I

Preparation of Rabbit Anti-Human Chorionic Gonadotropic Serum:

Male New Zealand white rabbits weighing 3 kg. are immunized as follows: Highly purified human chorionic gonadotropin (10,000 i.u./mg.) is dissolved in saline to give a concentration of 15,000 i.u./ml. This solution is mixed with an equal volume of Freund's complete adjuvant and 0.5 ml. is injected into each rabbit subcutaneously once a week for a period of eight weeks. At the end of the eighth week, blood is drawn, the serum obtained by centrifugation, and stored at −20°C. until used. Freund, (Ann. Rev. Microbiol., 1947, 1:291)

EXAMPLE II

Preparation of Anti-HCG Globulin

To 10 ml of rabbit anti-HCG serum is added an equal volume of saturated aqueous ammonium sulfate. The resulting suspension is kept in the cold room overnight. Next morning the suspension is centrifuged and the supernatant solution is discarded. The resulting globulin precipitate, which contains the antibodies, is dissolved in distilled water and dialyzed against distilled water until free of salt. The contents of the dialysis bag are removed, lyophilized, and reconstituted with 5 ml. of 0.85% sodium chloride solution, and kept frozen until used.

EXAMPLE III

Sensitization of Latex with HCG Anti-Serum

Dow polystyrene latex (0.8 micron) is diluted with distilled water to give a 2 percent concentration. To 98 ml. of this latex suspension is added 2 ml. of rabbit anti-HCG serum which has been extracted with ½ volume of chloroform, centrifuged, and removed from the solvent. The mixture is stirred and placed into a 56°C water bath for one hour. At the conclusion of the heating period, 100 ml. of 0.1M sodium citrate (pH 6.0) is added; the suspension is stirred and reheated at 56°C for 1–2 hours. After heating, the suspension is stored at 4°C. Shelf life of the composition of this and the following examples may be improved by the addition of Thimerasol in a concentration of 1:10000.

EXAMPLE IV

Sensitization of Latex with HCG Anti-Serum

Dow polystyrene latex (0.8 micron) is diluted with distilled water to give a 2% concentration. To 98 ml. of this latex suspension is added 2 ml. of rabbit anti-HCG serum; the mixture is stirred and placed into a 56°C water bath for 1 hour. At the conclusion of the heating period, 100 ml. of distilled water is added; the suspension is stirred and reheated at 56°C for 1–2 hours. After heating, the suspension is stored at 4°C.

EXAMPLE V

Sensitization of Latex with HCG Anti-Serum

Dow polystyrene latex (0.8 micron) is diluted with distilled water to give a 1% suspension of latex. To 99 ml. of this suspension is added 1 ml. of rabbit anti-HCG serum and the suspension is heated at 56°C for 1 hour. After heating the suspension is stored at 4°C.

EXAMPLE VI

Sensitization of Latex with Anti-HCG Globulin

For use, 1 ml. of the globulin fraction of Example II is diluted with 1 ml. of 10–50% albumin (from any source) solution and added to 98 ml. of a 2% polystyrene latex suspension. The mixture is stirred and heated for 1 hour at 56°C. At the conclusion of the heating, 100 ml. of 0.1M citrate buffer, pH 6.0, is added and the mixture heated again for 1–2 hours at 56°C., after which it is stored at 4°C.

EXAMPLE VII

Sensitization of Latex with Anti-HCG Globulin

One ml. of the globulin fraction of Example II, diluted with 1 ml. of 10–50% albumin solution, is added to 200 ml. of 1% polystyrene latex and heated at 56°C. for 1–2 hours. The suspension is cooled and stored at 4°C.

I claim:

1. A reagent for the detection of human chorionic gonadotrophin which consists essentially of an aqueous suspension of finely divided polystyrene latex particles having adsorbed thereon human chorionic gonadotrophin antibodies, said reagent being prepared by mixing an aqueous suspension of latex particles with whole blood human chorionic gonadotrophin antiserum containing anti-human chorionic gonadotrophin and heating said mixture at about 54° to about 57° C. for from about 1 to about 2 hours.

2. The reagent of claim 1, wherein the particles are polystyrene latex particles having a diameter of between 0.15 and 0.9 microns and wherein the concentration ratio by volume of latex particles to suspending medium is between 0.5 percent to 2 percent.

3. The reagent of claim 2, wherein said reagent is buffered to a pH of between 6 and 8.4.

4. The reagent of claim 2, additionally comprising a diluent selected from the group consisting of water and an aqueous buffer, wherein said reagent is prepared by the additional steps of adding the diluent, and reheating the diluted mixture at about 54° to about 57°C for from about 1 to about 2 hours.

5. A method of detection of human chorionic gonadotrophin in a specimen suspected of containing the same which comprises the steps of:
   a. mixing the reagent of claim 1 with an equal volume of specimen suspected to contain human chorionic gonadotrophin selected from the group consisting of serum and plasma;
   b. agitating the mixture;
   c. determining the presence of agglutination of particles of the reagent medium, the occurrence of said agglutination indicating the presence of human chorionic gonadotrophin in the specimen.

6. A method of detecting human chorionic gonadotrophin in a specimen of serum or plasma suspected of containing the same which comprises:
   a. mixing between 0.025 and 0.1 ml of the reagent of claim 2 with an equal volume of the specimen;
   b. agitating the mixture for from about 1 to about 3 minutes;
   c. and determining the presence of agglutination at the end of this time, the occurrence of said agglutination indicating the presence of human chorionic gonadotrophin in the specimen.

7. The method of claim 6, which comprises the additional step of diluting said specimen with an equal volume of buffer prior to addition of the latex reagent.

8. A method for preparing a composition for the direct determination of the existence of pregnancy by the admixture therewith of a sample of urine, plasma or serum, which consists essentially of:
   a. obtaining blood containing anti-human chorionic gonadotrophin from lower mammals to which human chorionic gonadotrophin had been administered;
   b. separating the cells from the serum by centrifugation of the whole blood;
   c. mixing an aqueous suspension of polystyrene latex particles with the whole blood serum, wherein the concentration ratio by volume of latex particles to suspending medium is between 0.5% and 2%; and
   d. heating said mixture at about 54°–57°C. for about 1 to 2 hours.

9. The mehtod of claim 8 wherein the polystyrene latex particles have a diameter of 0.15 to 1 micron and wherein the lower mammal is rabbit.

10. The method of claim 9 wherein the latex particles have a diameter of 0.6 to 0.9 micron and wherein said reagent is prepared by the additional steps of adding a diluent selected from the group consisting of water and an aqueous buffer, and reheating the diluted mixture at about 54°–57°C. for about 1 to 2 hours.

* * * * *